US012169998B2

(12) United States Patent
Kato et al.

(10) Patent No.: US 12,169,998 B2
(45) Date of Patent: Dec. 17, 2024

(54) GAMING TABLE

(71) Applicant: SEGA SAMMY CREATION INC., Tokyo (JP)

(72) Inventors: Fumihiro Kato, Tokyo (JP); Yuji Shimada, Tokyo (JP)

(73) Assignee: SEGA SAMMY CREATION INC., Tokyo (JP)

( * ) Notice: Subject to any disclaimer, the term of this patent is extended or adjusted under 35 U.S.C. 154(b) by 239 days.

(21) Appl. No.: 17/792,384

(22) PCT Filed: Jan. 14, 2020

(86) PCT No.: PCT/JP2020/000859
§ 371 (c)(1),
(2) Date: Jul. 12, 2022

(87) PCT Pub. No.: WO2021/144839
PCT Pub. Date: Jul. 22, 2021

(65) Prior Publication Data
US 2023/0048756 A1 Feb. 16, 2023

(51) Int. Cl.
*G07F 17/32* (2006.01)
*H01Q 1/22* (2006.01)

(52) U.S. Cl.
CPC ......... *G07F 17/322* (2013.01); *H01Q 1/2208* (2013.01)

(58) Field of Classification Search
CPC ...... G07F 17/322; H01Q 1/2208; H01Q 7/00; H01Q 21/061; H01Q 1/2216; H01Q 1/2225; A63F 5/00
See application file for complete search history.

(56) References Cited

U.S. PATENT DOCUMENTS 8,425,312 B1 * 4/2013 Kirsch ...................... A63F 1/18 463/25
11,630,964 B1 * 4/2023 Seitz .................. G06K 7/10316 235/451
12,056,564 B2 * 8/2024 Seitz .................. G06K 7/10366
2009/0117967 A1 * 5/2009 Koyama ................. G07F 17/32 463/17
2009/0291751 A1 * 11/2009 Koyama ............. G07F 17/3232 463/25

(Continued)

FOREIGN PATENT DOCUMENTS

JP 2009-112490 A 5/2009

OTHER PUBLICATIONS

WO, PCT/JP2020/000859 ISR and Written Opinion, Jul. 22, 2021.

*Primary Examiner* — Justin L Myhr
*Assistant Examiner* — Carl V Larsen
(74) *Attorney, Agent, or Firm* — HAUPTMAN HAM, LLP

(57) ABSTRACT

To provide a technology related to a gaming table with an antenna detection range defined more appropriately. The gaming table includes a plurality of antennas, a placement board, and a control unit. Each of the plurality of antennas is provided at such a position that a detection range is located above a placement surface of the placement board. Each of the plurality of antennas is provided such that a portion of a first antenna overlaps a portion of a second antenna. The control unit exerts control to identify a tip on the placement board and not to identify the same tip repeatedly.

7 Claims, 11 Drawing Sheets

(56) References Cited

U.S. PATENT DOCUMENTS

| | | | | |
|---|---|---|---|---|
| 2011/0004276 | A1* | 1/2011 | Blair | A61B 5/0006 607/60 |
| 2012/0100901 | A1* | 4/2012 | Kirsch | G07F 17/3293 463/11 |
| 2015/0141126 | A1* | 5/2015 | Hoyt | G06K 19/0723 463/25 |
| 2016/0217645 | A1* | 7/2016 | Seitz | G06K 7/10465 |
| 2020/0018810 | A1* | 1/2020 | Seitz | G01S 13/74 |
| 2021/0011107 | A1* | 1/2021 | Seitz | G07F 17/322 |
| 2022/0044517 | A1* | 2/2022 | Shigeta | G06K 19/07773 |

* cited by examiner

GAMING TABLE

TECHNICAL FIELD

The present invention relates to a gaming table.

BACKGROUND ART

Games played by using gaming tables are known. Patent Document 1 discloses a gaming table that receives a signal emitted from a gaming tip placed on a placement board via antennas, and acquires identification information on the gaming tip based on the received signal.

CITATION LIST

Patent Document 1: Japanese Patent Laid-Open No. 2009-112490

SUMMARY OF INVENTION

When trying to detect information emitted from a gaming medium such as a gaming tip using a plurality of antennas on the gaming table disclosed in Patent Document 1, some areas may occur in which the information cannot be detected in an area above the placement board.

An object of the present invention is to provide a technology related to a gaming table with an antenna detection range defined more appropriately.

A gaming table according to an aspect of the present invention includes: a plurality of antennas; a placement board; and a control unit, in which each of the plurality of antennas is provided at such a position that a detection range is located above a placement surface of the placement board, each of the plurality of antennas is provided such that a portion of a first antenna among the antennas overlaps a portion of a second antenna among the antennas, and the control unit exerts control to identify a tip on the placement board and not to identify the same tip repeatedly.

Advantageous Effect of Invention

According to the present invention, a technology related to a gaming table with an antenna detection range defined more appropriately can be provided.

DESCRIPTION OF EMBODIMENT

An embodiment of the present invention will be described with reference to the attached drawings.

First, an appearance of a gaming table 100 according to the present embodiment will be described with reference to FIG. 1. The gaming table 100 is a gaming table to be installed in an amusement facility or the like. In the present embodiment, the gaming table 100 is used for playing a game such as, for example, roulette, Dai siu (Sic bo), or Craps.

Figure 1:
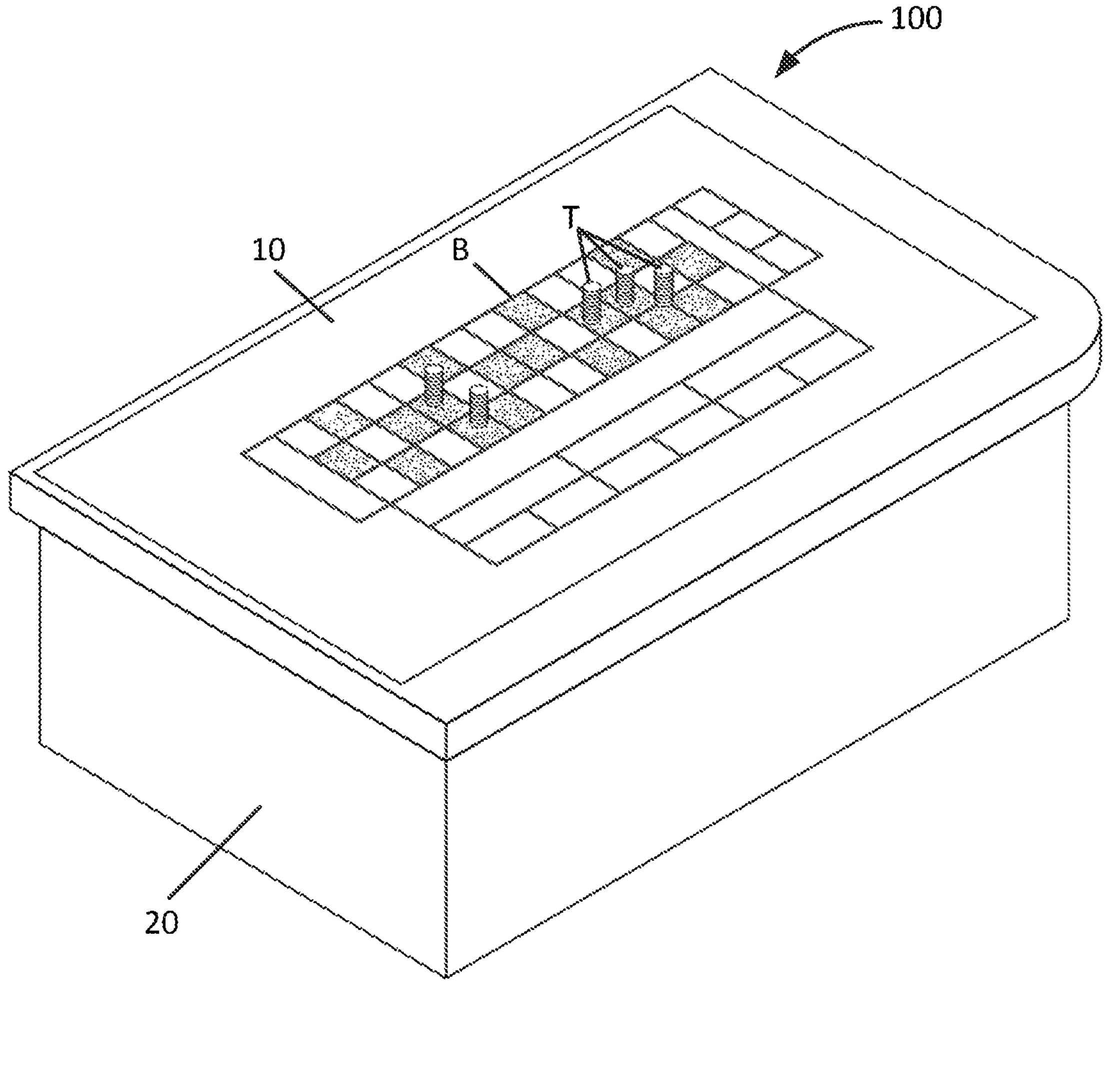
FIG. 1 is a perspective view showing an example of an appearance of a gaming table in an embodiment.

As shown in FIG. 1, the gaming table 100 includes a placement board 10 and an enclosure 20. The placement board 10 is a board for placing gaming items such as tip, cards, and dice on its upper surface. In the example shown in FIG. 1, a plurality of tips T are stacked and placed in a bet area B defined on the upper surface (placement surface) of the placement board 10. A configuration of the tip T will be described later. The placement board 10 includes antennas in the inside thereof. The upper surface of the placement board 10 has a sheet laid to cover the antennas. The sheet is made of an infrared transmitting material, for example. Details of the antennas will be described later. The enclosure 20 is a member that supports the placement board 10. The enclosure 20 further includes a management device in the inside thereof. Details of the management device will be described later.

Figure 2:
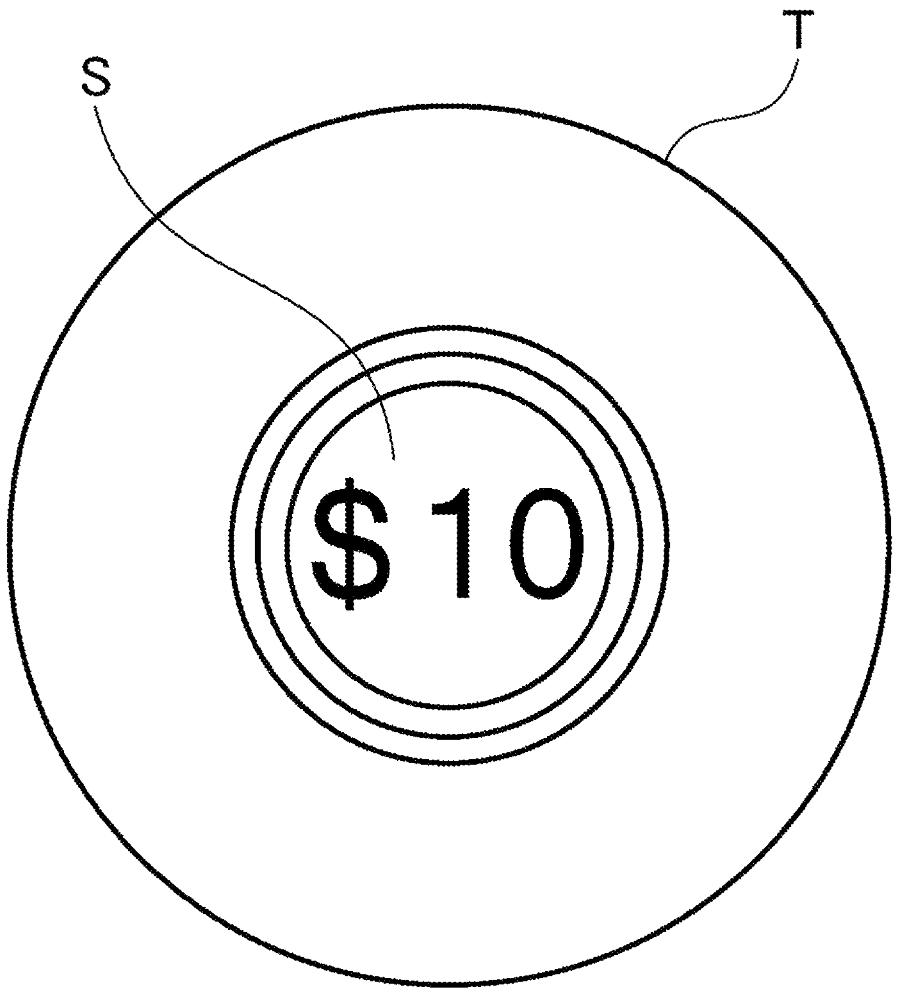
FIG. 2 is a schematic diagram showing an example of an appearance of a tip in the embodiment.
Figure 3:
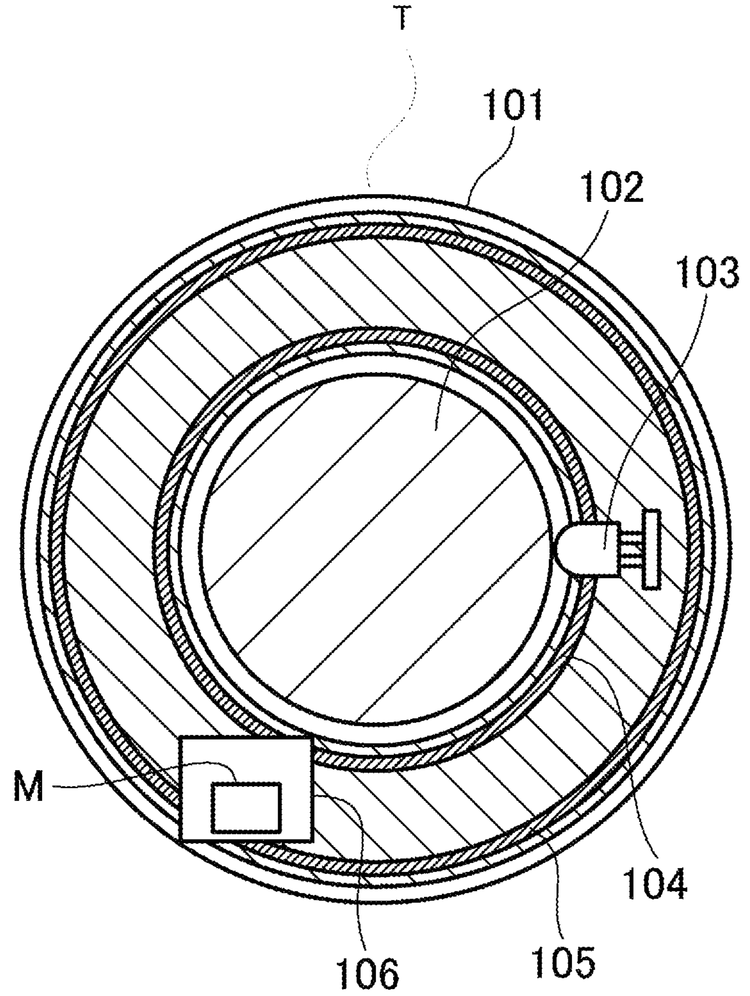
FIG. 3 is a schematic diagram showing an example of an internal configuration of the tip in the embodiment.

The configuration of the tip T will be described with reference to FIG. 2 and FIG. 3. FIG. 2 is a schematic diagram showing an appearance of the tip T. FIG. 3 is a schematic diagram showing an internal configuration of the tip T. The tip T is a medium to be used for various types of gaming (such as roulette and card games) played on the gaming table. Note that the tip T has any shape and size.

In the present embodiment, the tip T has a main body 101 formed into a substantially disc shape (coin shape), and a light guiding part 102, a light receiving part 103, a receiving antenna 104, a communication antenna 105, and a processing part 106 having a memory M are provided therein. As shown in FIG. 2, a sticker S indicating a gaming value (for example, $10) of the tip T is attached to a surface of the tip T (a portion corresponding to the light guiding part 102). This sticker S is made of an infrared transmitting film or the like.

The light guiding part 102 includes a light guide plate that transmits infrared rays for use in data communication, and is arranged at a central part so as to include a central axis of the main body 101. The light guide plate transmits and diffuses infrared rays therein. Note that the present embodiment illustrates infrared communication as an example of data communication, but may also be applied to ultraviolet communication or visible light communication.

The light receiving part 103 includes an infrared LED (light emitting diode) sensor, for example, and is provided at one or more positions in a manner facing an outer peripheral surface of the light guiding part 102. The light receiving part 103 receives infrared light (a light emission signal) propagated from the outside of the tip T through the light guiding part 102.

The light guiding part 102 and the light receiving part 103 are utilized for identifying the location of the tip T, but are not essential for the present embodiment. Thus, description of a method of identifying the location of the tip T will be omitted.

The receiving antenna 104 is an antenna for receiving power supply (what is called wireless power feeding) from the gaming table in a non-contact manner, and receives power supply from the outside utilizing a long wave in a LF (low frequency) band in the present embodiment. Power received via the receiving antenna 104 is supplied to each part by the processing part 106.

The communication antenna 105 is an antenna for performing data communication with a control unit (which will be described later) provided for the gaming table 100 in a non-contact manner, and utilizes a short wave in a HF (high frequency) band in the present embodiment. Note that, although both the receiving antenna 104 and the communication antenna 105 employ an electromagnetic induction system in the present embodiment, a radio wave system may be employed.

The processing part 106 is configured to include a processor, a memory, and the like. By reading a control program and data stored in the memory, the processor centrally controls each part of the tip T.

Figure 4:
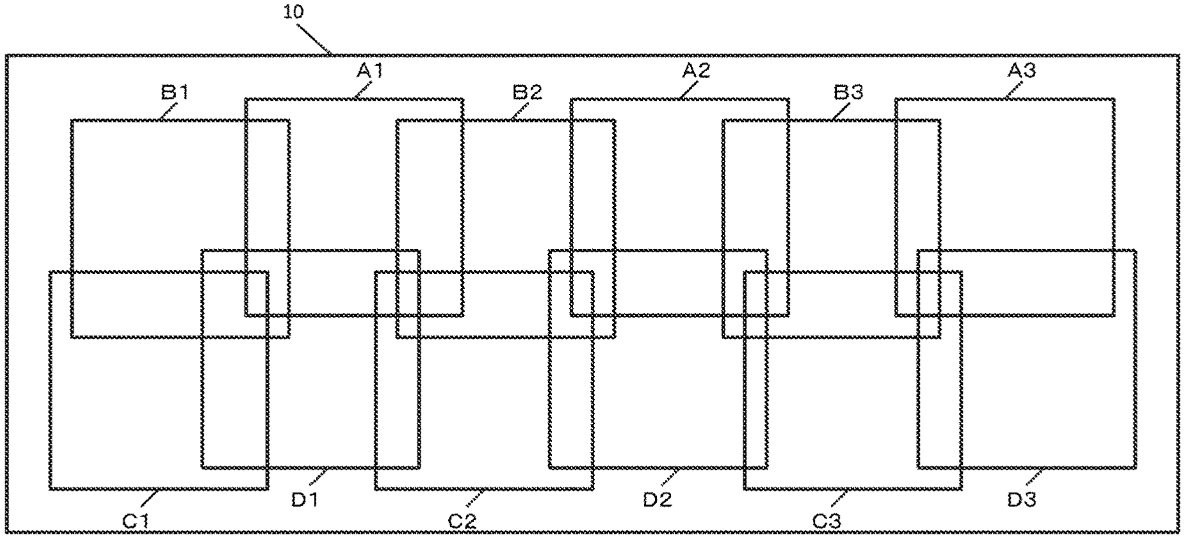
FIG. 4 is a cross-sectional view of a placement board in the embodiment as seen from an upper surface side.

The antennas provided inside the placement board 10 will be described with reference to FIG. 4. FIG. 4 shows a cross-sectional view of the placement board 10 as seen from an upper surface side. The placement board 10 is provided with antennas A1, A2, A3, B1, B2, B3, C1, C2, C3, D1, D2, and D3. In the present embodiment, the antennas are divided into groups. The antennas A1, A2, and A3 are divided into a group A, the antennas B1, B2, and B3 are divided into a group B, the antennas C1, C2, and C3 are divided into a group C, and the antenna D1, D2, and D3 are divided into a group D. In the following description, the antennas A1, A2, A3, B1, B2, B3, C1, C2, C3, D1, D2, and D3 will also be referred to as antennas Ant when describing them without any distinction.

Although not shown, inside each of the antennas Ant in the vicinity of an end of each of the plurality of antennas Ant included in the placement board 10, a conducting wire is provided circularly so as to form a coil shape. Each of the plurality of antennas Ant is provided at such a position that a detection range is located above the placement surface of the placement board 10. In the example shown in FIG. 4, for example, the plurality of antennas Ant are provided on a surface substantially level with the placement surface of the placement board 10. The detection range of the antenna Ant is defined in accordance with a range where radio waves emitted from the antenna Ant reach and the intensity of the radio waves.

In the present embodiment, each of the plurality of antennas Ant is provided at such a position that a predetermined area above the placement surface of the placement board 10 is occupied by the detection range of each of the plurality of antennas Ant. For example, each of the plurality of antennas Ant is provided at such a position that the bet area defined on the placement surface of the placement board 10 and an area 20 cm above the bet area are occupied by the respective detection ranges of the plurality of antennas Ant.

In the present embodiment, a portion (for example, an antenna end area) of a certain antenna Ant (first antenna) among the plurality of antennas Ant is provided for the gaming table 100 in a manner overlapping a portion of another antenna Ant (second antenna) among the plurality of antennas Ant. For example, the plurality of antennas Ant are provided such that a portion of an antenna Ant in a certain group overlaps a portion of another antenna Ant belonging to another group. In the example shown in FIG. 4, a portion of the antenna A1 belonging to the group A is provided in a manner overlapping portions of the antennas B1 and B2 belonging to the group B, the antennas C1 and C2 belonging to the group C, and the antenna D1 belonging to the group D.

As described above, according to the present embodiment, the placement board 10 is provided with not one but a plurality of antennas at such positions that the detection ranges are located above the placement surface of the placement board 10. By providing the plurality of antennas, radio waves can be emitted at a weaker radio wave intensity and in a wider range of the placement surface.

Figure 5:
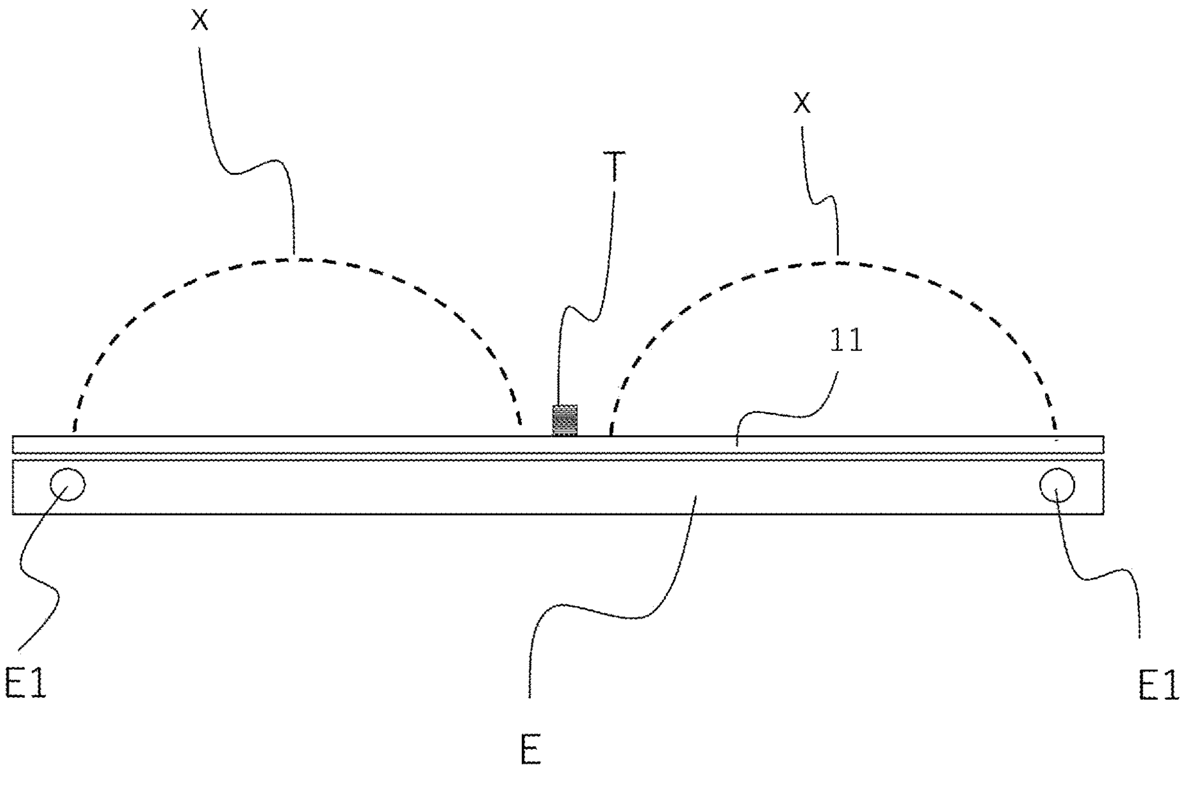
FIG. 5 is a conceptual diagram for describing an example of a placement board of a gaming table in a conventional technology.

For comparison with the present embodiment, an example of providing a large-sized antenna all over the bet area rather than providing the plurality of antennas Ant will be described with reference to FIG. 5. FIG. 5 shows an example of a cross-sectional view of a placement board provided with a single antenna E having substantially the same size as the bet area under a sheet 11 laid on a placement surface in a conventional technology, as seen from a side surface side. In this example, the plurality of tips T are stacked and placed on the upper surface of the sheet 11 in the vicinity of the center. A range where radio waves emitted from the vicinity of an end of the antenna E (a conducting wire E1 of the antenna E) reach is indicated by a boundary x. The boundary x is a boundary indicating a range where radio waves having an intensity of a degree that enables the tips T to be correctly read reach from the conducting wire E1 of the antenna E, and is an imaginary boundary line specified based on an experiment. As indicated by the boundary x, radio waves from the antenna E do not reach the tips T. Thus, the tips T cannot be detected in this example. Note that, in a case in which the intensity of radio waves to be emitted from the antenna E is increased such that the radio waves reach the tips T, the radio waves will reach a wider area outside the placement surface of the placement board, which may raise a problem such as exertion of an influence on equipment present in the vicinity of the placement board. Another problem may also arise in that tips placed on the antenna cannot be read.

A mechanism in which, even if a detection target is placed in the vicinity of the end of a certain antenna, a high position above the end of the antenna can also be included in the antenna detection range in the present embodiment will be described with reference to FIG. 6. According to the present embodiment, each of the plurality of antennas is provided for the placement board 10 in a manner partially overlapping another antenna. Thus, even if a detection target (object) is placed in the vicinity of the end of a certain antenna, a high position above the end of the antenna is also included in the antenna detection range.

Figure 6:
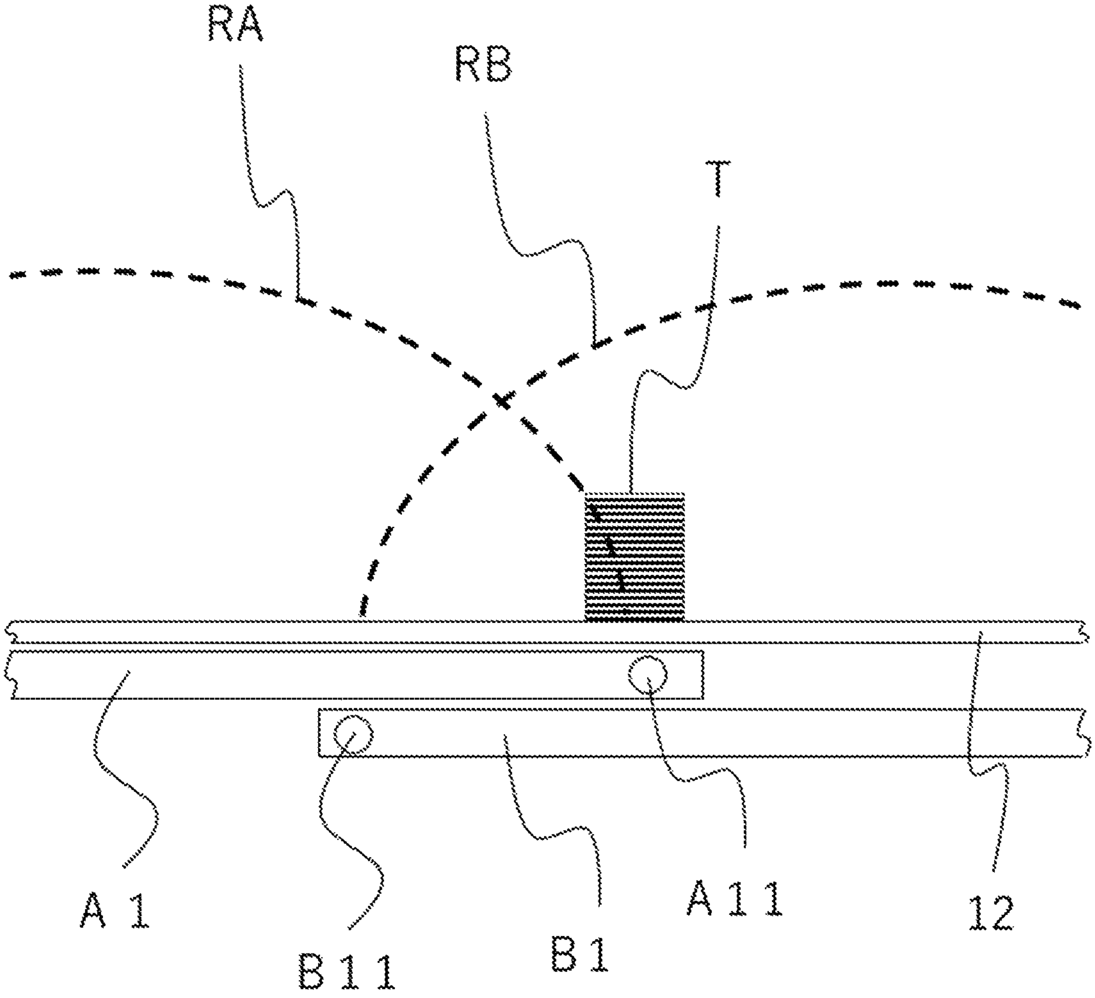
FIG. 6 is a conceptual diagram schematically showing a magnetic field of antennas provided for the placement board in the embodiment.

FIG. 6 is a conceptual diagram schematically showing magnetic fields of the antennas provided for the placement board 10. In general, the magnetic field has a high density and the magnetic force is strong in the vicinity of the conducting wire of an antenna, but the magnetic field covers a low range. On the other hand, with increasing distance from the conducting wire, the magnetic force is weaker, but the magnetic field covers a higher range. In other words, the antenna detection range covers a low range in the vicinity of the end of an antenna (the conducting wire of the antenna), and covers a higher range in an area more distant from the end of the antenna.

In the example shown in FIG. 6, the plurality of tips T are stacked and placed on the upper surface of a sheet 12 laid on the upper surface of the placement board 10. The position at which the tips T are placed is in the vicinity of the end of the antenna A1, which is a position away from the end of the antenna B1 partially overlapping the antenna A1 by a predetermined distance. Thus, the detection range of the antenna A1 includes the position of the tips T stacked on a lower side among the stacked tips T, but does not include the position of the tips T stacked on an upper side. In other words, a boundary RA (an imaginary boundary line specified based on an experiment) of a range where radio waves emitted from the vicinity of a conducting wire A11 provided in the vicinity of the end of the antenna A1 reach covers the tips T on the lower side among the stacked tips T, but does not cover the tips T on the upper side. On the other hand, the detection range of the antenna B1 includes the position of the tips T stacked on the upper side among the stacked tips T. In other words, a boundary RB (an imaginary boundary line specified based on an experiment) of a range where radio waves emitted from the vicinity of a conducting wire B11 provided in the vicinity of the end of the antenna B1 reach covers the tips T on the upper side among the stacked tips T. Therefore, even if the tips T are stacked high in the vicinity of the end of the antenna A1, the tips T stacked on the upper side can also be detected by the antenna B1. An example of a control order of switching the antennas Ant between an on state and an off state will be described with reference to FIG. 7. In the present embodiment, each of the plurality of antennas Ant provided for the placement board 10 is controlled such that the antennas Ant overlapping each other alternately repeat switching between the on state and the off state. For example, suppose that a portion of a first antenna Ant and a portion of a second antenna Ant among the plurality of antennas Ant are provided in a manner overlapping each other. In this case, control is exerted such that the second antenna is in the off state when the first antenna Ant is in the on state, and each of the plurality of antennas Ant repeats switching between the on state and the off state.

The on state of the antenna Ant is a state in which the antenna Ant emits radio waves. The off state of the antenna Ant is a state in which the antenna Ant does not emit radio waves. For example, when in a state in which current is flowing to the antenna Ant, the antenna Ant is in the on state. For example, when in a state in which current is not flowing to the antenna Ant, the antenna Ant is in the off state.

When the antennas Ant overlapping each other are brought into the on state at the same time, the antennas Ant interfere with each other. Thus, according to the present embodiment, control is exerted in the gaming table 100 provided with the plurality of antennas Ant such that the antennas Ant overlapping each other alternately repeat switching between the on state and the off state so as not to be brought into the on state at the same time. Interference between the antennas Ant can thereby be prevented.

The plurality of antennas Ant may be respectively divided into groups such that the antennas Ant overlapping each other belong to different groups. The antennas Ant shown in FIG. 4 are divided into the groups A, B, C, and D as described earlier. As shown in FIG. 4, an antenna belonging to each of the groups A, B, C, and D does not overlap an antenna belonging to the same group. To achieve such control of not bringing antennas overlapping each other into the on state at the same time, control may be exerted such that switching of the antennas between the on state and off state is repeated on a group basis as in the example shown in FIG. 4.

Figure 7:
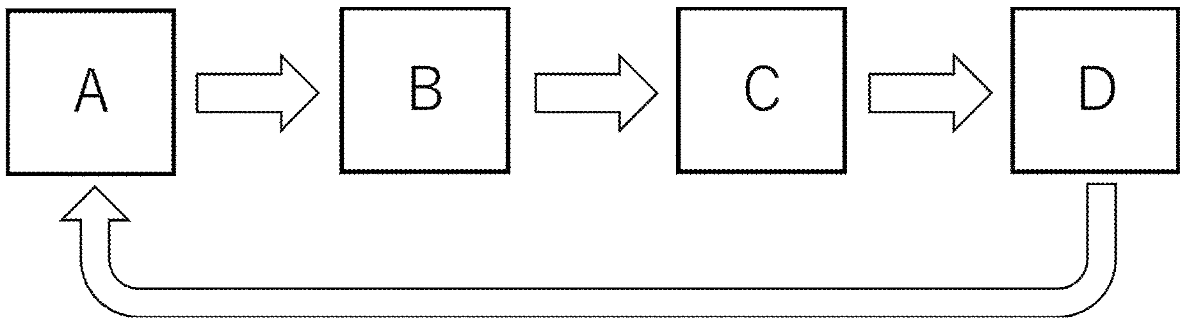
FIG. 7 is a conceptual diagram showing a control order when controlling switching of antennas between an on state and an off state in the embodiment.

FIG. 7 is a conceptual diagram showing an order of groups controlled to be switched to the on state when controlling switching of the antennas Ant between the on state and the off state on the basis of the groups A, B, C, and D. Control of switching the antennas Ant belonging to each group to the on state may be exerted in the order of the groups A, B, C, and D as shown in FIG. 7, for example. While an antenna Ant belonging to a certain group is in the on state, an antenna Ant belonging to another group is in the off state. For example, while an antenna Ant belonging to the group A is controlled to be in the on state, an antenna Ant belonging to another group is controlled to be in the off state. A period during which a certain antenna Ant is in the on state can be set arbitrarily. For example, control may be exerted such that a certain antenna Ant is in the on state for a 0.1 second, then the antenna Ant is brought into the off state, and another antenna Ant is in the on state for a 0.1 second.

In addition, in the present embodiment, each of the plurality of antennas Ant provided for the placement board 10 may include a disconnecting mechanism that disconnects conduction of the conducting wire of the antenna Ant. The disconnecting mechanism is implemented by a relay, for example. In this case, the control of bringing the antenna Ant into the off state includes control of disconnecting conduction of the conducting wire by the above-described disconnecting mechanism. The control of bringing the antenna Ant into the on state includes control of connecting conduction of the conducting wire by the above-described disconnecting mechanism. In general, current may flow to the conducting wire of the antenna Ant even in the off state under the influence of another neighboring antenna Ant in the on state. Thus, by disconnecting conduction of the conducting wire of the antenna Ant in the off state (producing an open circuit), current can be prevented from flowing to cause the neighboring antennas Ant to interfere with each other.

Figure 8:
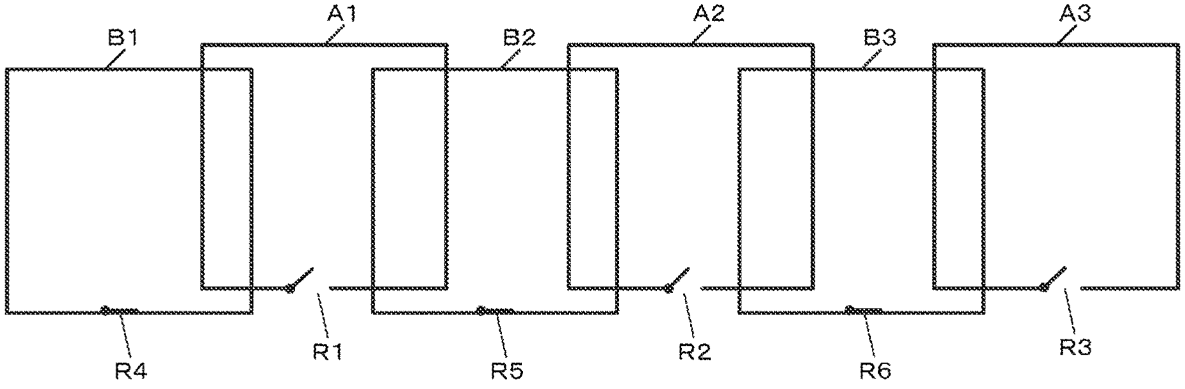
FIG. 8 is a conceptual diagram schematically showing antennas in the on state and antennas in the off state in the embodiment.

An example of control over the antennas Ant between the on state and the off state will be described with reference to FIG. 8. FIG. 8 is a conceptual diagram schematically showing the antennas Ant in the on state and the antennas Ant in the off state. In FIG. 8, the antennas A1, A2, and A3 are in the off state. The antennas B1, B2, and B3 are in the on state by virtue of relays R4, R5, and R6. Conduction of the conducting wires of the antennas A1, A2, and A3 in the off state is disconnected by relays R1, R2, and R3, respectively.

An example of directions of current in the antennas Ant provided for the placement board 10 will be described with reference to FIGS. 9A and 9B. In the present embodiment, the antennas Ant may be configured such that, concerning the plurality of antennas Ant in the on state, the direction of current in each of the antennas Ant is opposite to the direction of current in another adjacent or neighboring antenna Ant. The configuration in which the direction of current in each of the antennas Ant is opposite to the direction of current in another adjacent or neighboring antenna Ant can prevent the plurality of antennas Ant in the on state from interfering with each other.

Figure 9A:
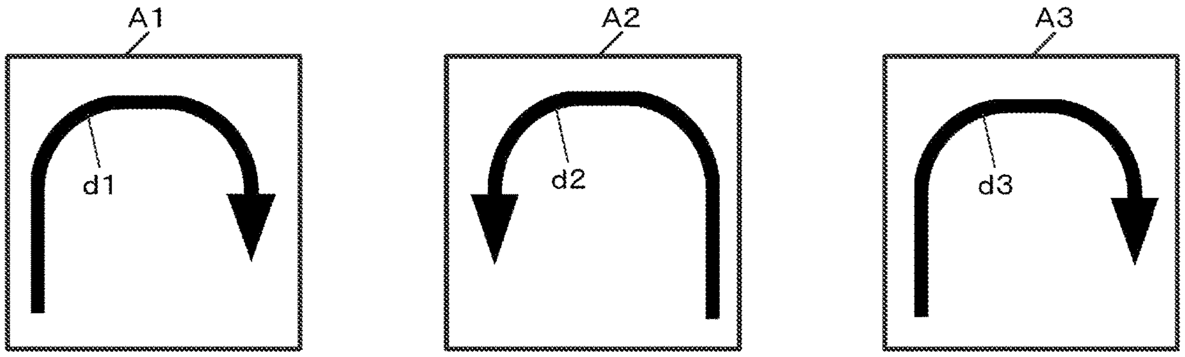
FIG. 9A is a conceptual diagram schematically showing directions of current in the antennas in the on state in the embodiment.
Figure 9B:
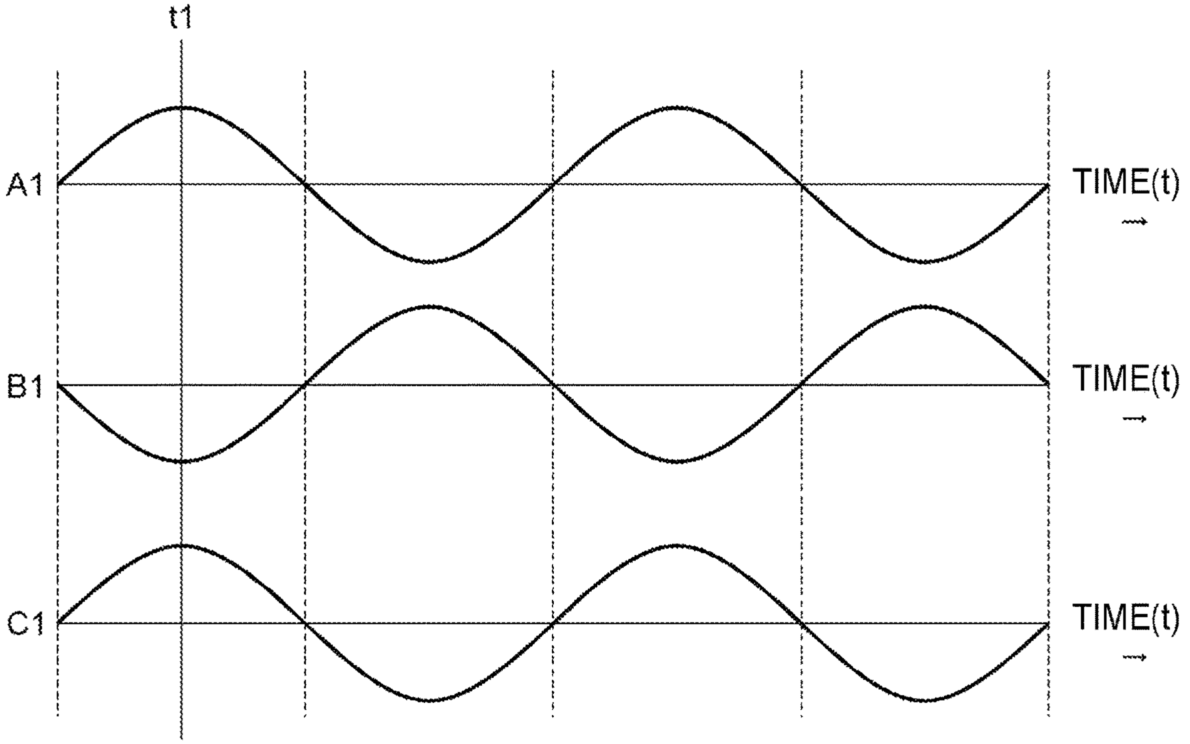
FIG. 9B is a graph showing temporal changes in the current flowing in each of antennas A1, A2, and A3.

FIG. 9A is a conceptual diagram schematically showing the directions of current in the antennas A1, A2, and A3 in the on state. FIG. 9B is a graph showing temporal changes in current flowing in each of the antennas A1, A2, and A3. In the example shown in FIG. 9A and FIG. 9B, the antennas A1 and A2 are provided at adjacent or neighboring positions, and a direction d1 of current in the antenna A1 and a direction d2 of current in the antenna A2 at a point of time t1 in FIG. 9B are opposite. The antennas A2 and A3 are provided at adjacent or neighboring positions, and the direction d2 of current in the antenna A2 and a direction d3 of current in the antenna A3 at the point of time t1 in FIG. 9B are opposite.

Figure 10:
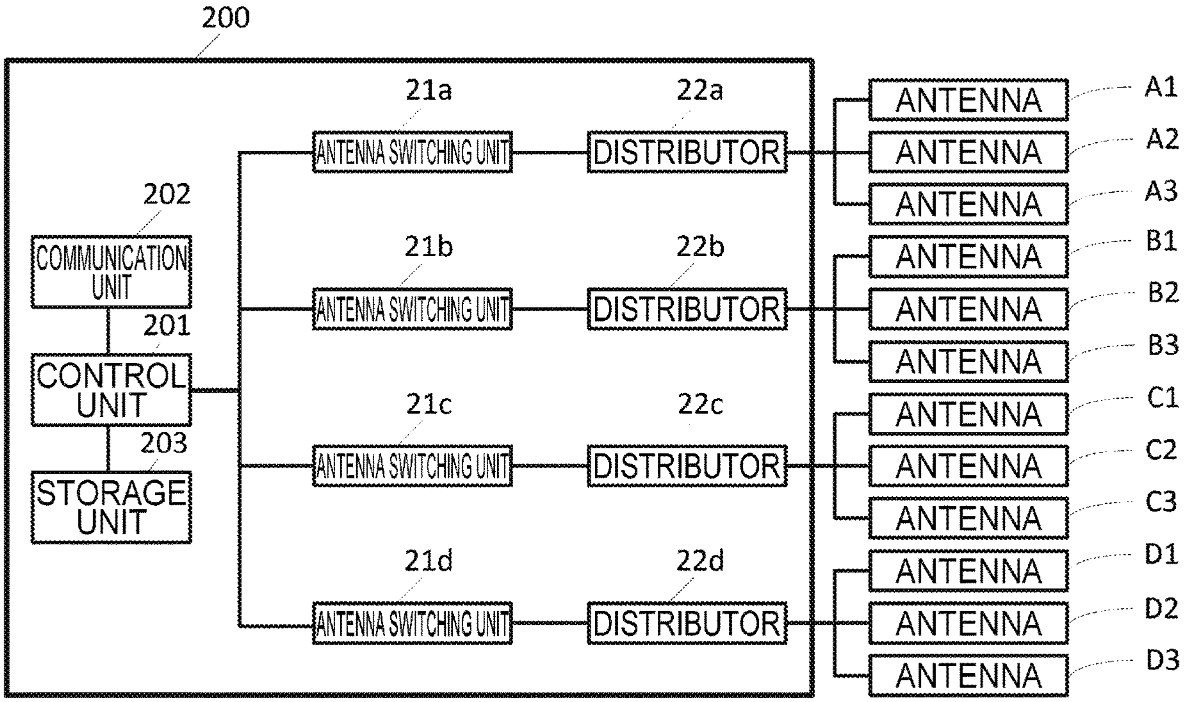
FIG. 10 is a block diagram showing an example of a hardware configuration of a management device included in the gaming table in the embodiment.

An example of a hardware configuration of the management device included in the gaming table 100 will be described with reference to FIG. 10. As shown in FIG. 10, a management device 200 includes a control unit 201, a communication unit 202, a storage unit 203, antenna switching units 21*a*, 21*b*, 21*c*, and 21*d*, and distributors 22*a*, 22*b*, 22*c*, and 22*d*. In the following description, when describing the respective antenna switching units 21*a*, 21*b*, 21*c*, and 21*d* without distinction, they may also be referred to as an antenna switching unit 21. When describing the respective distributors 22*a*, 22*b*, 22*c*, and 22*d* without distinction, they may also be referred to as a distributor 22.

The distributor 22 is a processing device that distributes a received signal. The distributor 22 distributes a predetermined signal received from the antenna switching unit 21 to the antenna Ant provided for the placement board 10 in accordance with predetermined control. The distributor 22 transmits a signal received from the antenna Ant to the antenna switching unit 21.

In the example shown in FIG. 10, the distributor 22*a* distributes a signal received from the antenna switching unit 21*a* to the antennas A1, A2, and A3, and transmits signals received from the antennas A1, A2, and A3 to the antenna switching unit 21*a*. The distributor 22*b* distributes a signal received from the antenna switching unit 21*b* to the antennas B1, B2, and B3, and transmits signals received from the antennas B1, B2, and B3 to the antenna switching unit 21*b*. The distributor 22*c* distributes a signal received from the antenna switching unit 21*c* to the antennas C1, C2, and C3, and transmits signals received from the antennas C1, C2, and C3 to the antenna switching unit 21*c*. The distributor 22*d* distributes a signal received from the antenna switching unit 21*d* to the antenna D1, D2, and D3, and transmits signals received from the antenna D1, D2, and D3 to the antenna switching unit 21*d*.

The antenna switching unit 21 is a device that reads information held in the tip T and writes information into the tip T via the antennas Ant and the distributor 22 provided for the placement board 10. For example, the antenna switching unit 21*a* transmits a signal received from the control unit 201 to the distributor 22*a* for writing information into the tip T. The antenna switching unit 21*a* receives signals from the antenna Ant and the distributor 22*a* for reading information held in the tip T.

The storage unit 203 stores various types of information. The storage unit 203 is implemented by a magnetic storage device or a semiconductor element, for example.

The communication unit 202 is a communication interface for the management device 200 to communicate with the outside. For example, the communication unit 202 transmits information about a processing result obtained by the management device 200 to the outside, and receives information necessary for processing by the management device 200.

The control unit 201 controls various components included in the management device 200. The control unit 201 includes a processor and a memory, for example. When the processor executes a computer program stored in the memory or the storage unit 203, the control unit 201 exerts various types of control concerning operations of components included in the gaming table 100. The control unit 201 stores information about a processing result obtained by the control unit 201 in the storage unit 203.

The control unit 201 exerts control of switching between the on state and the off state of current flowing in the antennas Ant and control of switching disconnection and connection of the conducting wire of the antenna Ant by the disconnecting mechanism (for example, a relay), for example.

The control unit 201 can identify the number of the tips T (objects) present in the detection range of the antennas Ant (above the placement surface of the placement board 10). In detail, the control unit 201 first acquires identification information based on a signal emitted from the tips T (objects) via each of the antenna Ant, the distributor 22, and the antenna switching unit 21. The control unit 201 identifies the number of the tips T present in the detection range of the antenna Ant based on the acquired identification information. For example, the control unit 201 identifies the number of pieces of identification information obtained by eliminating repetition from the acquired identification information as the number of the tips T.

The above-described embodiment is provided for facilitating understanding of the present invention, and is not intended for limited interpretation of the present invention. The respective elements included in the embodiment and their arrangement, materials, conditions, shapes, sizes, and the like are not limited to the illustrated ones, but can be modified as appropriate.

REFERENCE SIGNS LIST

100 gaming table
200 management device
201 control unit
202 communication unit
203 storage unit
21*a*, 21*b*, 21*c*, 21*d* antenna switching unit
22*a*, 22*b*, 22*c*, 22*d* distributor
10 placement board
20 enclosure
A1, A2, A3, B1, B2, B3, C1, C2, C3, D1, D2, D3 antenna
T tip

The invention claimed is:

1. A gaming table, comprising:
a plurality of antennas;
a placement board; and
a control unit, wherein
each of the plurality of antennas is configured to have a detection range above a placement surface of the placement board,
the plurality of antennas comprises a plurality of first antennas and a plurality of second antennas alternatingly arranged along a first row,
each first antenna of the plurality of first antennas overlaps a portion of at least one second antenna among the plurality of second antennas, and does not overlap any other first antenna among the plurality of first antennas,
each second antenna of the plurality of second antennas overlaps a portion of at least one first antenna among the plurality of first antennas, and does not overlap any other second antenna among the plurality of second antennas, and
the control unit is configured to control the plurality of antennas to identify an object on the placement board, wherein the control unit is configured to:

in a first time period, switch the plurality of first antennas to an ON state of emitting radio waves, and switch the plurality of second antennas to an OFF state of not emitting radio waves, and in a second time period different from the first time period, switch the plurality of second antennas to the ON state, and switch the plurality of first antennas to the OFF state.

2. The gaming table according to claim 1, wherein the plurality of antennas is configured to have the corresponding detection ranges occupying a predetermined area above the placement surface.

3. The gaming table according to claim 1, further comprising, for each of the plurality of antennas:

a disconnecting mechanism configured to disconnect a conducting wire of the antenna, wherein the control unit is configured to control the antenna to switch into the OFF state by controlling the disconnecting mechanism to disconnect the conducting wire.

4. The gaming table according to claim 1, wherein in the first time period, each first antenna among the plurality of first antennas is configured to have a current flowing in a direction opposite to a direction of a current flowing in an adjacent first antenna among the plurality of first antennas, and in the second time period, each second antenna among the plurality of second antennas is configured to have a current flowing in a direction opposite to a direction of a current flowing in an adjacent second antenna among the plurality of second antennas.

5. The gaming table according to claim 1, wherein the plurality of antennas further comprises a plurality of third antennas and a plurality of fourth antennas alternatingly arranged along a second row, the second row parallel to the first row, each third antenna of the plurality of third antennas overlaps a portion of at least one fourth antenna among the plurality of fourth antennas, and does not overlap any other third antenna among the plurality of third antennas, each fourth antenna of the plurality of fourth antennas overlaps a portion of at least one third antenna among the plurality of third antennas, and does not overlap any other fourth antenna among the plurality of fourth antennas, and the control unit is configured to:

in the first time period, switch the plurality of third antennas and the plurality of fourth antennas to the OFF state, in the second time period, switch the plurality of third antennas and the plurality of fourth antennas to the OFF state, in a third time period different from the first and second time periods, switch the plurality of third antennas to the ON state, and switch the plurality of first antennas, the plurality of second antennas and the plurality of fourth antennas to the OFF state, and in a fourth time period different from the first to third time periods, switch the plurality of fourth antennas to the ON state, and switch the plurality of first antennas, the plurality of second antennas and the plurality of third antennas to the OFF state.

6. The gaming table according to claim 5, wherein each first antenna of the plurality of first antennas overlaps a portion of a third antenna among the plurality of third antennas, and a portion of a fourth antenna among the plurality of fourth antennas, each second antenna of the plurality of second antennas overlaps a portion of a third antenna among the plurality of third antennas, and a portion of a fourth antenna among the plurality of fourth antennas, each third antenna of the plurality of third antennas overlaps a portion of a first antenna among the plurality of first antennas, and a portion of a second antenna among the plurality of second antennas, and each fourth antenna of the plurality of fourth antennas overlaps a portion of a first antenna among the plurality of first antennas, and a portion of a second antenna among the plurality of second antennas.

7. The gaming table according to claim 6, wherein in the first time period, each first antenna among the plurality of first antennas is configured to have a current flowing in a direction opposite to a direction of a current flowing in an adjacent first antenna among the plurality of first antennas, in the second time period, each second antenna among the plurality of second antennas is configured to have a current flowing in a direction opposite to a direction of a current flowing in an adjacent second antenna among the plurality of second antennas, in the third time period, each third antenna among the plurality of third antennas is configured to have a current flowing in a direction opposite to a direction of a current flowing in an adjacent third antenna among the plurality of third antennas, and in the fourth time period, each fourth antenna among the plurality of fourth antennas is configured to have a current flowing in a direction opposite to a direction of a current flowing in an adjacent fourth antenna among the plurality of fourth antennas.

* * * * *